United States Patent
Caliskan et al.

(10) Patent No.: US 6,606,975 B1
(45) Date of Patent: Aug. 19, 2003

(54) PASSIVE TURBULENCE CONTROL ASSEMBLY AND A METHOD FOR CREATING TURBULENCE

(75) Inventors: Ari Garo Caliskan, Ypsilanti, MI (US); Gary Steven Strumolo, Beverly Hills, MI (US); Ronald Hugh Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/679,011

(22) Filed: Oct. 4, 2000

(51) Int. Cl.$^7$ ................................. F02B 31/00
(52) U.S. Cl. .................. 123/306; 123/590; 138/37
(58) Field of Search ................ 123/306, 337, 123/590; 48/189.4; 138/37, 39

(56) References Cited

U.S. PATENT DOCUMENTS

| | | | |
|---|---|---|---|
| 3,671,208 A | * | 6/1972 | Medsker ................ 123/590 X |
| 4,015,577 A | | 4/1977 | Elsbett et al. |
| 4,180,041 A | | 12/1979 | Miyazaki et al. |
| 4,207,854 A | | 6/1980 | Alford et al. |
| 4,308,829 A | | 1/1982 | Yamada et al. |
| 4,320,725 A | | 3/1982 | Rychlik et al. |
| 4,381,743 A | | 5/1983 | Mair |
| 4,398,511 A | * | 8/1983 | Nemazi ................ 123/306 X |
| 4,413,598 A | * | 11/1983 | Tsutsumi ................ 123/306 |
| 4,465,034 A | * | 8/1984 | Tsutsumi ................ 123/306 |
| 5,165,374 A | * | 11/1992 | Chapman et al. ........ 123/308 |
| 5,592,917 A | | 1/1997 | Kim |
| 5,740,778 A | | 4/1998 | Corcoran et al. |
| 6,227,185 B1 | * | 5/2001 | Spracher ................ 123/590 |

FOREIGN PATENT DOCUMENTS

| | | | | |
|---|---|---|---|---|
| DE | 3600192 | * | 7/1986 | ............ 123/308 |
| JP | 53-1712 | | 10/1978 | |
| JP | 58-48712 A | | 3/1983 | |
| JP | 58-126428 | | 7/1983 | |
| JP | 1-87827 A | | 3/1989 | |
| JP | 1-113517 A | | 5/1989 | |
| JP | 3-267524 | * | 11/1991 | ............ 123/590 |

* cited by examiner

*Primary Examiner*—Tony M. Argenbright
(74) *Attorney, Agent, or Firm*—Dykema Gossett; Carlos L. Hanze

(57) ABSTRACT

A passive turbulent control assembly 10 having a generally flat plate member 30 which is movably disposed within an intake port member 12 by the use of a pin 36 and a pair of selectively compressible or tuning assemblies 48, 50. The member 30 always allows air 17 to flow through the member 12 and occupies a position, within the member 12, which is determined by the amount of air 17 entering the member 12, effective to increasingly constrict the interior cavity 52 as the amount of air 17 entering the member 12 decreases.

18 Claims, 2 Drawing Sheets

PASSIVE TURBULENCE CONTROL ASSEMBLY AND A METHOD FOR CREATING TURBULENCE

(1) FIELD OF THE INVENTION

The present invention generally relates to a passive turbulence control assembly and to a method for creating turbulence and more particularly, to an assembly which is selectively disposed within a vehicle, effective to allow for the selective creation of turbulent flow into at least one engine cylinder.

(2) BACKGROUND OF THE INVENTION

It is desirable to turbulently cause air to enter a cylinder of an engine prior to the creation of spark or ignition within that cylinder. Such turbulent flow (often referred to as "small scale turbulence") increases the rate at which the contained fuel is burned in order to improve idle stability, enable higher "EGR" levels to be utilized, reduce undesirable combustion byproducts, and reduce the variability of the amount of torque produced by the cylinder.

Typically, the air is received into an intake manifold and is communicated into the engine cylinders through two port members. Conventionally, a port deactivation assembly, operable under stored program control, dynamically determines the amount of air which is being communicated to the cylinders as a function of the engine speed and selectively and substantially closes one of the port members in response to this determination. That is, at relatively high engine speeds both port members are typically caused to be open, thereby allowing a relatively large amount of air to quickly enter the cylinders in a substantially turbulent manner. At relatively low engine speeds, requiring only a relatively small amount of air having a relatively slow speed, one of the port members is typically caused to be closed, thereby allowing the air to enter the cylinders through a single port which is effective to substantially increase the velocity of the air as it enters the cylinders and to cause the desired small scale turbulence.

While the foregoing conventional approach does provide for desirable turbulent flow, it does require some cost due to the use of a controller which dynamically or "actively" determines the engine speed and/or the amount of air being communicated to the cylinders and which actively controls an assembly in order to selectively open or fully close one of the ports.

SUMMARY OF THE INVENTION

It is a first object of the present invention to provide a passive turbulence control assembly which creates turbulent flow within an engine cylinder.

It is a second object of the present invention to provide a method for passively creating turbulent flow within an engine cylinder.

It is a third object of the present invention to provide an assembly for tunably creating turbulent flow within an engine cylinder.

It is a fourth object of the present invention to provide an assembly and a method for cost. effectively creating small scale turbulence within an engine cylinder.

According to a first aspect of the present invention, a turbulence control assembly is provided for use with an air intake port member. The assembly comprises a member which is disposed within the intake port member; and at least one selectively compressible member which couples the member to the intake port member.

According to a second aspect of the present invention, a method is provided for causing turbulent flow to occur within an engine cylinder. The method comprises the steps of receiving a certain amount of air within an intake port member; and blocking a certain amount of the air, effective to always allow at least a portion of the received air to flow through the intake port member while increasingly constricting the port member as the amount of air flowing through the intake port member decreases.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
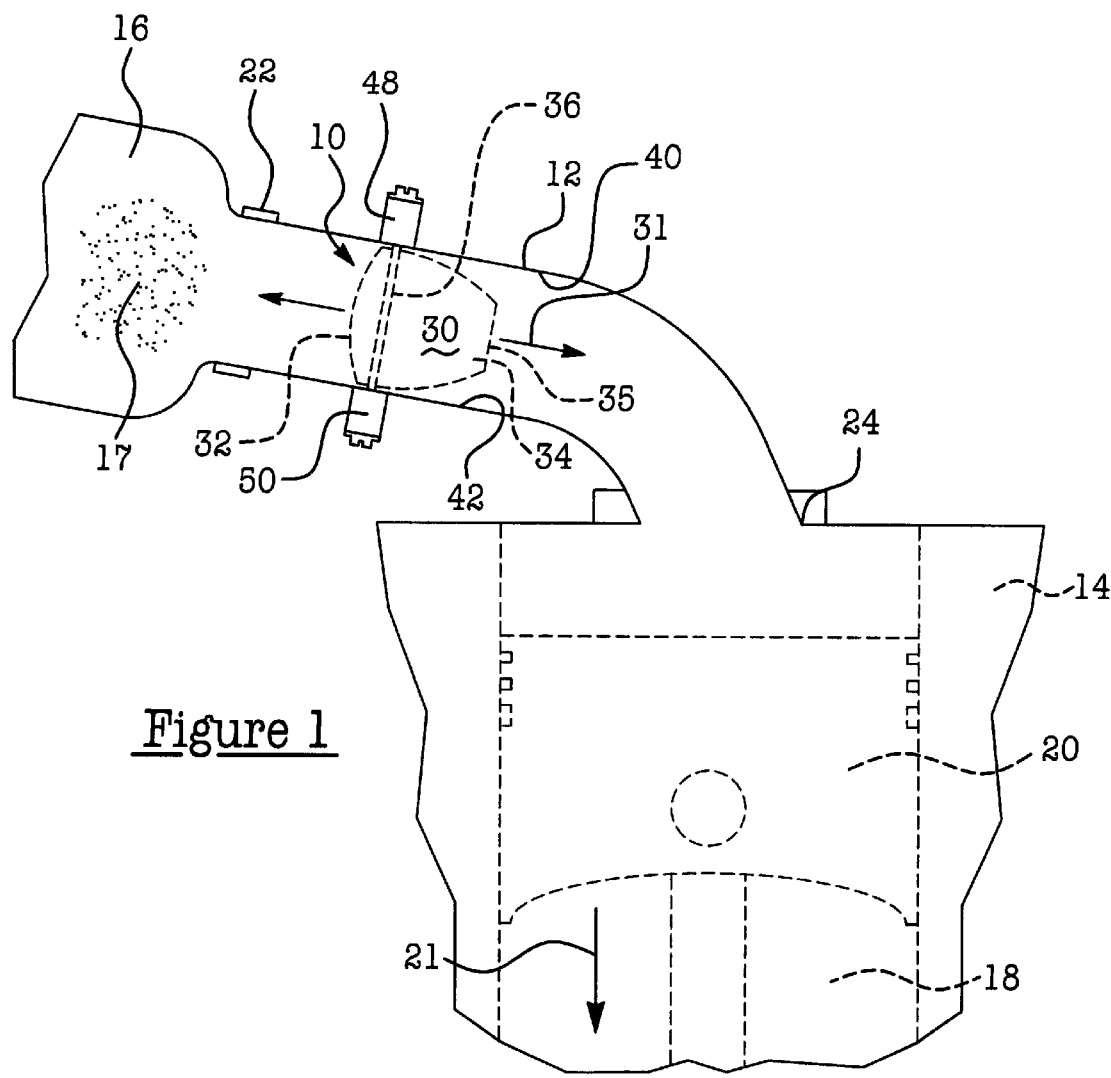
FIG. 1 is a partial view of a vehicular engine and a top and partial cut-away view of a turbulence control assembly which is made in accordance with the teachings of the preferred embodiment of the invention and which is shown operatively assembled within the conventional air intake port member of the vehicular engine.
Figure 2:
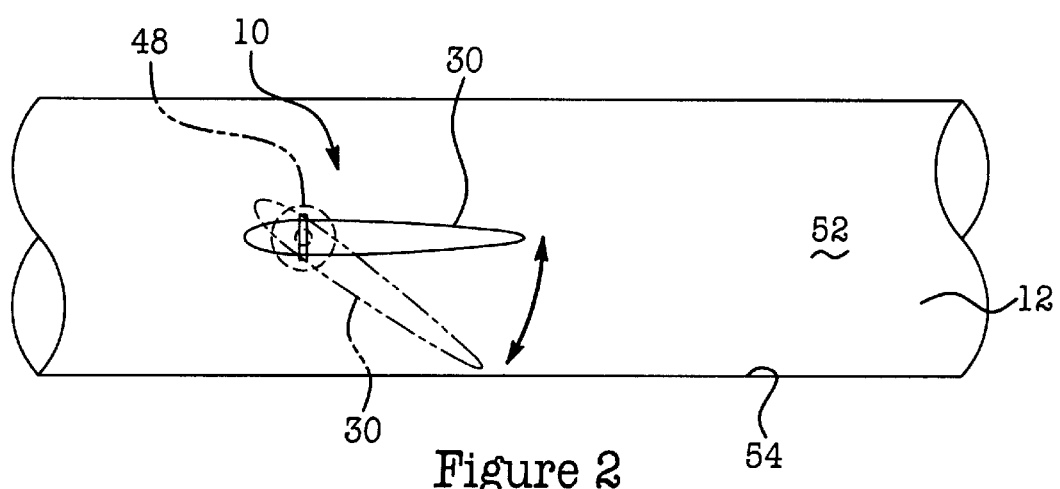
FIG. 2 is side view of the turbulence control assembly which is shown in FIG. 1.
Figure 3:
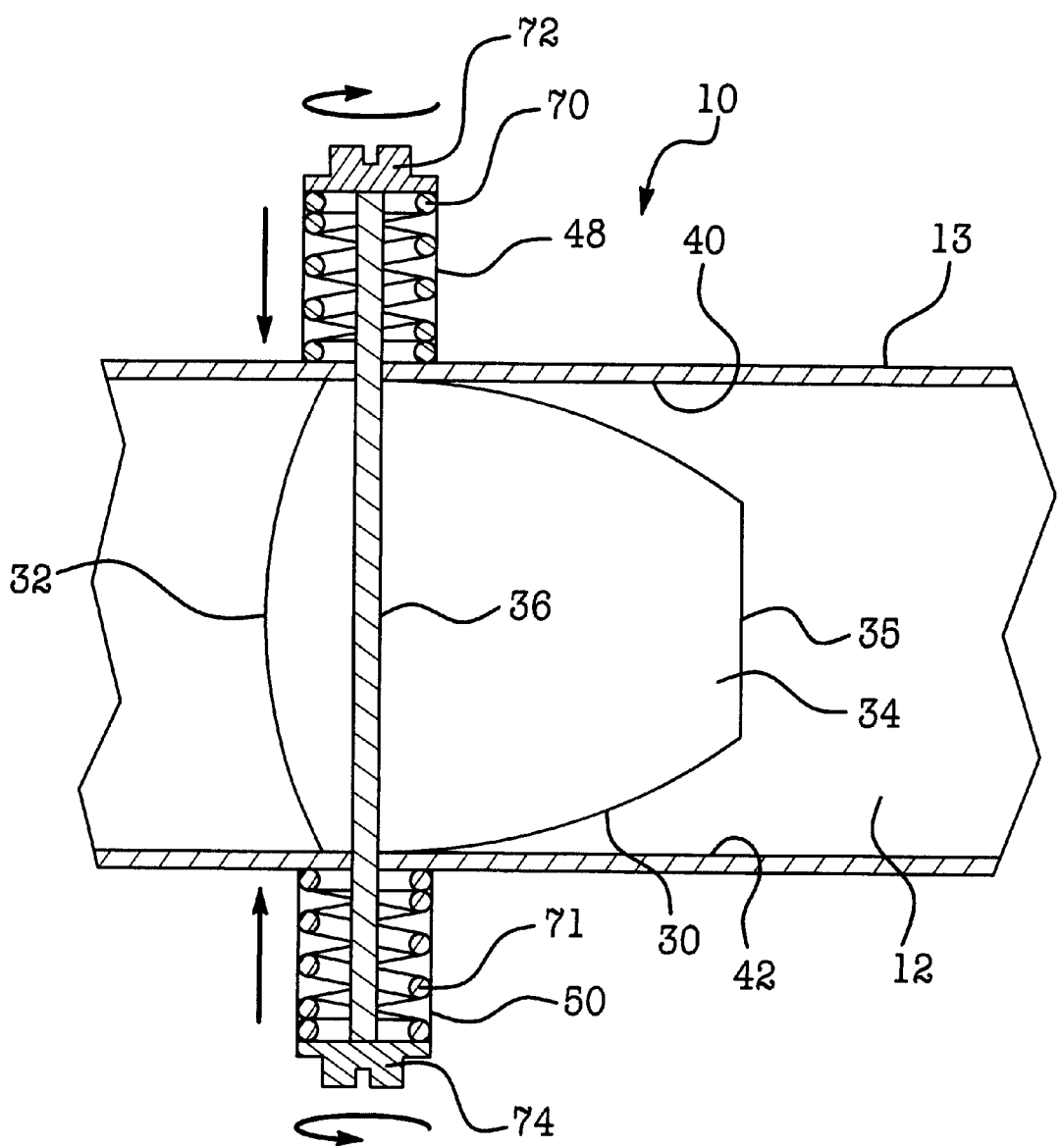
FIG. 3 is an exploded sectional view of the turbulence control assembly which is shown in FIG. 1.

Referring now to FIGS. 1–3, there is shown a passive turbulence control assembly 10 which is made in accordance with the teachings of the preferred embodiment of the invention. As shown, assembly 10 is movably disposed within a conventional vehicular intake port member 12 which is operatively coupled to an engine 14 and to a conventional vehicular intake manifold member 16.

Particularly, the engine 14 typically comprises an internal combustion engine having at least one cylinder 18 which movably and reciprocally contains a piston 20 and which further selectively receives fuel and air 17 which are ignited, effective to move the cylinder 20 in the direction of arrow 21, thereby producing torque energy. As shown, the intake port member 12 is coupled to the intake manifold member 16 by the use of a conventional attachment or "band" member 22 and is further coupled to the engine 14 by another conventional attachment or "band" member 24.

Assembly 10 includes a generally flat plate 30 having a first bulging, protruding, and/or generally arcuate end portion 32 and a second and opposed tapered end portion 34 having a substantially planar edge 35. In another non-limiting embodiment, plate 30 may be substantially "tongue shaped" or helical. In one non-limiting embodiment of the invention, plate member 30 is manufactured and/or formed from a composite material and has a substantially uniform thickness of about 0.3 mm to about 0.8 mm.

Further, assembly 10 includes a pin 36 which transversely (i.e., in a direction which is substantially perpendicular to the longitudinal axis of symmetry 31 of plate 30) extends across the plate 30 and which traverses opposed surfaces 40, 42 of the member 12 while protruding from the member 12. Moreover, assembly 10 further includes a pair of substantially identical tuning or adjustment assemblies 48, 50 which respectively receive a unique end portion of the protruding pin 36 and which cooperatively allow the plate 30 to be movably disposed within the member 12.

In operation, the plate 30 normally constricts only a portion of the interior cavity 52 of the member 12 and is downwardly biased against the surface 54. In this manner, the plate 30 reduces or constricts the volume of cavity 52, thereby reducing the volume through which relatively low velocity air 17 may flow, effective to block the air 17 from flowing through a portion of cavity 52 and increasing the velocity of the air 17 which flows above portion 30 and through the remaining "non-constricted" portions of cavity 52, effective to increase large scale motion in the combustion chamber 18 (i.e., swirl, tumble and/or "swumble") which subsequently increases small scale turbulence levels at the time of spark or ignition.

Relatively large amounts of air 17 which quickly enter the tube 12 cause the plate 30 to be moved substantially parallel to the direction of the flow, thereby increasing the amount of volume through which the air 17 may flow. In this manner, the plate 30 always allows air 17 to flow through the port member 12 while assuming a position, within member 12, which is determined by the rate at which the air 17 enters the cavity 52. Further, in this manner, plate 30 increasingly constricts the port member 12 (e.g., the cavity 52) as the amount of air 17 flowing through the port member 12 increases.

Further, each tunable assembly 48, 50 respectively comprises a substantially identical spring 70, 71 which receives a unique and protruding end of the pin 36 and which contacts the outer surface 13 of member 12. Each opposed end of pin 36 threadably receives a unique one of the nuts 72, 74. Particularly, nuts 72, 74 selectively and respectively move upon opposed and protruding ends of the pin 36 and cooperate with the tube 12 to respectively and selectively compress or tighten springs 70, 71. (e.g., as the nuts 72, 74 are moved toward the outer surface 13 of member 12, the springs 70, 71 are respectively compressed). As the springs 70, 71 are selectively compressed, a greater amount of air 17 is needed to move the plate 30 from the previously delineated downwardly biased position (i.e., the plate 30 "is tightened") and as the springs 70, 71 are loosened, such plate movement may be accomplished by smaller amounts of air 17 (i.e., the plate 30 is "loosened"). In this manner, a user may selectively "tune" the assembly 10 to a particular engine 14 (e.g., a particular engine 14 may need the plate 30 to assume its downwardly biased or constricted position more often and for greater amounts and/or speeds of received air 17 than another engine in order to achieve the previously delineated benefits), thereby further allowing the assembly 10 to be adapted for use as an "aftermarket" product within a variety of vehicles and to selectively and tunably create turbulence within at least one cylinder 18 of an engine 14.

Hence, it should be appreciated that assembly 10 comprises a "passive" turbulence creation and control assembly since it does not require a controller to actively monitor the amount of air 17 entering the member 12 and to subsequently control the assembly 10 in accordance with the measured amount of received air. Further, it should be appreciated that the assembly 10 increases the turbulence upon receipt of air 17 traveling at a relatively low velocity while having substantially little effect on air 17 traveling at a relative high velocity within tube 12 and while never completely constricting cavity 52 or fully closing the member 52.

It is to be understood that the invention is not limited to the exact construction or method is shown and described above, but that various changes may be made without departing from the scope and the spirit of the invention as is set forth in the following claims.

What is claimed is:

1. An assembly which tunably creates turbulence within at least one cylinder of an engine, with said assembly including a first member and a selectively compressible assembly which is coupled to said first member.

2. The assembly of claim 1 wherein said selectively compressible assembly comprises a pair of substantially identical springs and a pair of nuts.

3. The assembly of claim 1 wherein said first member is flat and has a first arcuate end and a second tapered end.

4. The assembly of claim 1 wherein said first member is generally tongue shaped.

5. The assembly of claim 1 wherein said first member is helical.

6. The assembly of claim 1 wherein said first member is formed from a composite material.

7. An assembly for use within an intake port member which is adapted to receive air, said assembly comprising:

a plate;

a pin which transversely extends through said plate and which movably disposes said plate within said intake port member; and a pair of tuning members which are coupled to said pin and which are cooperatively effective to cause said plate to occupy a position which is determined by an amount of said received air while preventing said plate from fully closing said intake port member.

8. The assembly of claim 7 wherein said pair of tuning members comprise substantially identical springs.

9. The assembly of claim 8 wherein said assembly further includes a pair of compression members, each of which are coupled to a unique one of said springs.

10. The assembly of claim 9 wherein said plate is generally flat.

11. The assembly of claim 10 wherein said plate has a first arcuate end and a second tapered end having a flat edge.

12. The assembly of claim 11 wherein said plate is formed from a composite material.

13. A method for causing turbulent flow comprising the steps of:

receiving a certain amount of air within an intake port member;

providing a tuning member placed within said intake port member; and causing said tuning member to occupy a position determined by said amount of received air, with said tuning member blocking a certain amount of said received air, so as to always allow at least a portion of the received air to flow through the intake port member.

14. The method of claim 13 wherein said member is tongue shaped.

15. The method of claim 13 wherein said member is tunably positioned within said intake port member.

16. The method of claim 13 wherein said member is tunably positioned within said intake port member.

17. The method of claim 13 wherein said member is helical.

18. The method of claim 13 wherein said step of causing said member to occupy a position determined by said amount of said received air comprises the steps of:

providing a pair of springs;

providing a pair of nuts;

coupling each of said pair of springs to said members; and coupling each of said nuts to said plate.

* * * * *